(No Model.)

A. MORCK, Jr.
SPECTACLE LENS.

No. 400,783. Patented Apr. 2, 1889.

Attest:
Geo. H. Potts.
W. E. Bowen.

Inventor:
August Morck Jr.,
By J. E. H. Bowen
Atty.

UNITED STATES PATENT OFFICE.

AUGUST MORCK, JR., OF WARREN, PENNSYLVANIA, ASSIGNOR OF ONE-HALF TO FRED. MORCK, OF SAME PLACE.

SPECTACLE-LENS.

SPECIFICATION forming part of Letters Patent No. 400,783, dated April 2, 1889.

Application filed September 10, 1887. Renewed July 16, 1888. Serial No. 280,124. (No model.)

*To all whom it may concern:*

Be it known that I, AUGUST MORCK, Jr., a citizen of the United States, and a resident of Warren, in the county of Warren and State of Pennsylvania, have invented certain new and useful Improvements in Spectacles or Eyeglasses, of which the following is a specification.

This invention relates to spectacles or eyeglasses; and it has for its object to improve that type of spectacles or eyeglasses which is designed to enable the user to see at close or distant range through the same pair of glasses.

Heretofore glasses for the purpose in question have been constructed in several ways—for instance, with semi-lenses of different convexities; with their line of junction straight, with each glass made up of two half-lenses of different powers, and with single glasses with a small portion of the surface ground thinner than the rest of the glass and sloping for distant vision. In all of these constructions the prismatic effect is liable to be, and often is, double vision, besides producing in many persons who use them blurred vision and dizziness.

In my construction I employ two lenses of different powers of such configurations and relative sizes as to avoid the objection of the eye resting at the same time on both lenses, and the consequent blurred or dizzy effect upon the vision.

Figure 1:
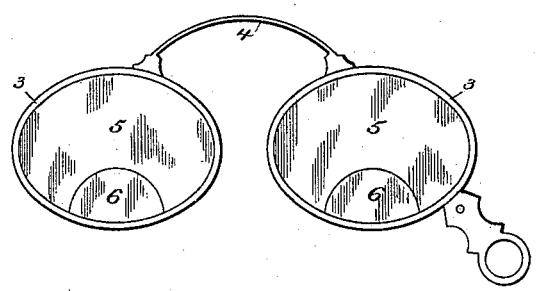
Figure 1:
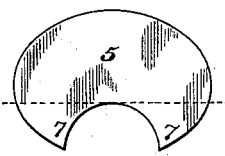
Figure 2:

In the accompanying drawings, which form a part of this description, and in which like features are indicated by like figures of reference in both views, Figure 1 is a view in elevation of a pair of eyeglasses embodying my improvement; and Fig. 2 is a plan view of the two members of which the glass is composed, said members being shown separated.

Referring to the drawings, the figure 3 indicates the frames which hold the glasses, and 4 the connecting-piece or bridge which joins the two frames, these parts being constructed as usual, whether the improvements be embodied in eyeglasses or spectacles.

The figure 5 designates the far-vision lens, and 6 the near-vision lens. The larger lens, 5, is shaped essentially as shown in the drawings, with about one-fourth to one-third of its lower surface cut out in such manner as to permit its lower edge, at each side of the semicircular cut therein, to extend to the bottom of the frame in which the glass is secured.

In Fig. 2 the horizontal dotted line indicates the relative height to which the smaller lens, 6, extends, and 7 designates the spaces to the right and left of the smaller lens, which are integral parts of the larger lens. The near-vision lens 6 is cut out of a separate piece of glass, and its edge of contact with the larger lens, 5, as well as the edge of contact of the larger lens itself, is square and not sloping. The smaller lens, 6, is nicely adjusted to the opening in the larger lens, and is secured therein by any cement adapted for securing the edges of the two lenses together—as, for instance, by diamond cement. The lower edge of the smaller lens will be made to conform to the configuration of the circumference of the larger lens, as well as to that of the inclosing-frame.

It is essential to the accomplishment of the purposes of my invention that the line of juncture of the two lenses shall not extend horizontally or clean across the field of vision, since, if it should, the eye could not avoid resting simultaneously, at times, on both lenses, and thus produce blurred vision; and this objection exists even where two segmental lenses are employed with a curved line of juncture extending clear across the field of vision. It is for this reason that I have arranged to have said line of juncture occupy a lower central position with relation to the larger lens, thereby preserving free from obstruction that part of the compound lens employed for the uses of far vision. By "lower central position" I mean below the horizontal axis of the larger lens and approximately central with reference to its vertical axis.

By the above-described construction I overcome the usual objections to glasses designed for both near and far vision—to wit, double and blurred vision, and consequent dizziness—since the shape of the far-vision lens is such that the eye, when directed to that lens, cannot, without special effort, be made to rest at the same time on the near-vision lens; and, while the near-vision lens is large enough for all practical purposes, it is not large enough to render it liable to be employed or attempted to be employed for far vision; and the fact that the larger or far-vision lens extends to the lower rim of the frame upon each side of the smaller lens enables the wearer of the glasses to look down with ease toward the floor or ground through that lens, and without liability of having the vision blurred.

Having thus described my invention, what I claim as new, and desire to secure by Letters Patent, is—

1. The combination, with a far-vision lens having its lower edge cut out centrally in semicircular form, of a near-vision lens shaped to fit said central semicircular opening in the far-vision lens, and secured therein by suitable adhesive substance, substantially as set forth.

2. A far-vision lens having its lower edge cut out centrally in semicircular form, and having the surface on both sides of the opening thus made extended to the lower rim of the inclosing-frame, in combination with a near-vision lens shaped to fit said central semicircular opening, substantially as set forth.

Signed at Warren, in the county of Warren and State of Pennsylvania, this 5th day of September, A. D. 1887.

AUGUST MORCK, Jr.

Witnesses:
GEO. H. HIGGINS,
CHAS. DINSMOOR.